United States Patent [19]

Jansen et al.

[11] Patent Number: 4,466,000
[45] Date of Patent: Aug. 14, 1984

[54] DATA COMMUNICATION SYSTEM

[75] Inventors: Gerardus L. M. Jansen; Gerardus J. J. Vos, both of Eindhoven, Netherlands

[73] Assignee: U.S. Philips Corporation, New York, N.Y.

[21] Appl. No.: 352,733

[22] Filed: Feb. 26, 1982

[30] Foreign Application Priority Data

Feb. 26, 1981 [NL] Netherlands .......................... 8100930

[51] Int. Cl.³ .......................... H04Q 9/00; H04J 1/06
[52] U.S. Cl. ..................................... 340/825.5; 178/3; 370/30; 370/45
[58] Field of Search ........................ 340/825.5, 825.51; 370/85, 69.1, 50, 45, 30; 178/3

[56] References Cited

U.S. PATENT DOCUMENTS 3,832,494  8/1974  Seim et al. .......................... 370/69.1
4,107,471  8/1978  Reed ..................................... 370/30
4,376,278  3/1983  Jacobsthal ......................... 340/825.5
4,387,425  6/1983  El-Gohary ........................... 370/85

Primary Examiner—Donald J. Yusko
Attorney, Agent, or Firm—Jack Haken; James J. Cannon, Jr.

[57] ABSTRACT

In a data communication system comprising a plurality of data stations which are interconnected by a common communication medium, simultaneously occurring prospective users of the communication medium undergo an arbitration to determine which one will gain access to it at any time. The system according to the invention provides the arbitration without negatively affecting the capacity of the communication medium. In the system, arbitration takes place during the data communication to decide who will be the next user, arbitration and communication being effected in frequency bands which differ from each other.

13 Claims, 8 Drawing Figures

DATA COMMUNICATION SYSTEM

BACKGROUND OF THE INVENTION

1. Field of the Invention

The invention relates to a data communication system of a type comprising a plurality of data stations which are interconnected by a common communication medium, each data station comprising a data transmitter for transmitting a data signal via the communication medium and further comprising a data receiver for receiving a signal transmitted by one of the other data stations via the communication medium and each data station comprising arbitration means to prevent more than one data transmitter transmitting simultaneously over the communication medium.

2. Description of the Prior Art

A system of the above type is known from the article: "Improvements of the multiprocessing capabilities of microprocessor busses", by W. Mahr and R. Patzelt, published in Euromicro Journal 4 (1978), pages 207-219; and is suitable for use in computer systems and as communication systems in, for example, hotels, hospitals, factories, offices and ships.

So, generally, the data stations are provided in spatially different locations within a limited area. In systems of this type the information is usually transmitted in successive packets. As there is potentially more than one (prospective) user simultaneously, while only one communication medium is available for one user at a time, a provision is required with which it is possible to determine which data station (user) is authorized to transmit the next packet. In para. 3.4 of the above-mentioned article this provision, which is commonly referred to as an arbitration provision, is implemented such that each data station is given a priority code word. The data stations which simultaneously request access to the communication medium offer this code word simultaneously to an arbitration bus interconnecting the data stations. The data station having the highest (priority) code word is given access to the communication medium while all the other stations are rejected. The code word is binary coded. In a number of steps, namely by first comparing the most significant bits of each code word and thereafter sequentially the less significant bits one data station is ultimately selected. A disadvantage of this manner of arbitration is that the system comprises an additional bus, known as the arbitration bus, which is connected to all data stations.

SUMMARY OF THE INVENTION

It is an object of the invention to provide a data communication system of the above-defined type in which arbitration is done efficiently and economically.

According to the invention, the data communication system is characterized in that the arbitration means in each data station comprise an arbitration transmitter for transmitting an arbitration signal via the communication medium, that the arbitration means further comprise an arbitration receiver for receiving an arbitration signal transmitted by one or more of the arbitration transmitters of other data stations via the communication medium and that the arbitration transmitters and receivers utilize an arbitration frequency band which is separated from the frequency band of the data transmitters and receivers.

An advantage of the data communication system in accordance with the invention is that arbitration can be effected, without loss in the data carrying capacity of the communication medium, and without the need for an additional arbitration bus.

It is advantageous that the data transmitters and receivers utilize a high-frequency band, whereas the arbitration transmitters and receivers employ a low-frequency band. This makes it possible for data transfer to take place at a high speed.

It is advantageous that the communication medium is a coaxial cable, since the cost for mounting and connecting such a cable is low.

An advantageous embodiment of the arbitration means in accordance with the invention is characterized in that the arbitration transmitter of each data station comprises a controlled arbitration current source, an integrator and a differential amplifier, that the differential amplifier has a first input for receiving the signal present on the communication medium, a second input for receiving a signal with which the data station participates in arbitration, and an output which controls the arbitration current source via the integrator, said current source being coupled to the communication medium.

It is advantageous to further provide the arbitration transmitter with a slew-rate limiting element which is arranged between the output of the differential amplifier and the integrator. The provision of such an element has the advantage that the (disturbing) influence of the high-frequency data signals on the low-frequency arbitration signals are considerably limited thereby.

BRIEF DESCRIPTION OF THE DRAWINGS

The invention and its advantages will now be further described by way of example, with reference to the accompanying drawings, of which.

DESCRIPTION OF THE PREFERRED EMBODIMENT

An increasing number of digital systems is realized in a distributed form. This means that such systems consist of a plurality of interconnected modules. Examples of such systems are: distributed computer networks, electronic mailing systems, electronic filing systems, monitoring systems, industrial process control systems, communication systems, music and speech distribution systems, etc. All these systems have modules which, although spatially distributed, are located in a relatively limited area. In order to enable communication to be effected between the modules they are interconnected by a common communication medium.

In distributed systems, the problem is encountered that more than one module wants to transmit information via the communication medium simultaneously. To overcome this problem it is determined which module (of two or more wanting to) may access the communication medium. There are two main types of systems which employ different operating principles, to effect this.

In a first type of system, after a communication via the communication medium has ended, each prospective user starts a waiting period which is weighted with a random value. When the waiting period of a given prospective user has elapsed, this user starts to present his information to the communication medium. Subsequently, when the waiting time of another prospective user has elapsed this user will also present his information to the communication medium. Owing to the random distribution of the waiting times there is therefore a certain risk of "collision". In the event of such a collision both participants stop and start new waiting periods. The waiting periods as well as the "collisions" cause loss of time. According, as there are more prospective users, the risk of "collisions" increases, as a result of which the maximum utilization rate of the communication medium decreases, correspondingly.

In a system of a second type, with which the present invention is concerned, an arbitration phase is passed through before the transmission of information is started. Such a system is described in the article "Improvements of the multiprocessing capabilities of microprocessor busses" by W. Mahr and R. Patzelt, published in Euromicro Journal 4 (1978) No. 4, pages 207-219, paragraph 3.4 of the article in particular. By comparing the bits of code words applied in the arbitration phase to parallel lines of the communication medium assigned to the arbitration it is determined which user is given access to the communication medium. A disadvantage of this second type of system is that if an additional arbitration (communication) medium is used for the arbitration, all participants must be connected thereto, or if the communication medium is employed for the arbitration, communication time is lost during the arbitration.

Figure 1:
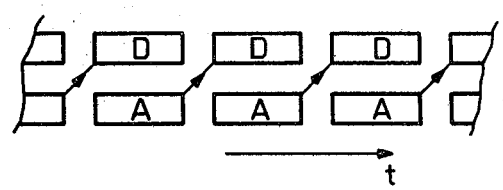
FIG. 1 is a symbolical representation of the transmission sequence of a system in accordance with the invention.

As shown schematically in FIG. 1, the frequency band of the communication system in accordance with the present invention is divided into two frequency bands and the information signals are transmitted in one frequency band and the arbitration signals are transmitted simultaneously therewith in the other frequency band. The information signals are usually transmitted in the form of data packets. In FIG. 1 the rectangles designated D symbolize data packets which are sequentially transmitted in successive time periods and the rectangles designated A symbolize arbitration signal periods each of which is available to determine which participant (data station) may transmit a data packet via the communication medium in the next time period. This relationship between the current period A and the next period D is symbolized by the arrows between A and D.

An advantage of this mode of transmission is that the communication medium available is utilized in an economical and efficient way. It is advantageous to select the frequency band used for the data signals in the high-frequency range as a high bit rate can then be realized. The low-frequency band is extremely suitable for the arbitration as in this band the time delays (transmit times) in the communication medium do not create insurmountable problems.

Each connection of the communication medium can be a single wire pair, a "twisted" pair, a shielded "twisted" pair, a coaxial cable, an optical fiber, etc. The communication medium may be a single connection arranged for the transmission of serial information, or it may be formed from a number of parallel connections which together constitute the communication medium for the transmission of multiple information.

Figure 2:
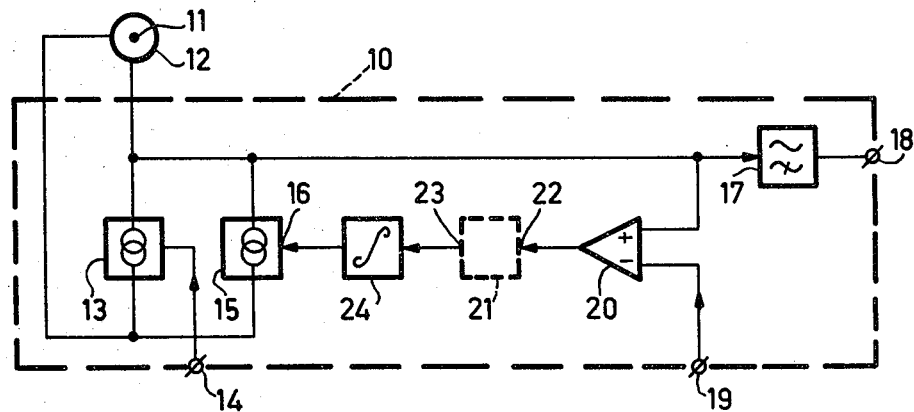
FIG. 2 shows a first embodiment of a data station comprising a data transmitter and receiver and an arbitration transmitter and receiver in accordance with the invention, FIGS. 3a; b are schematical representations of a number of signals occurring in the data station shown in FIG. 2.

FIG. 2 shows a first embodiment of a data station 10. The data station 10 is connected to the communication medium. In the further course of the description, it is assumed by way of example that the communication medium is in the form of a coaxial cable. The data station 10 is connected between an inner conductor 11 and an outer conductor 12 of the coaxial cable. One or more further data stations which can exchange information via the communication medium are connected to this coaxial cable. The further data stations are not shown in the Figure as they are not different from data station 10. The data station comprises a data transmitter 13, which is connected between the inner and outer conductors of the communication medium. The data transmitter has an input terminal 14 for receiving data signals to be transmitted. The (output stage of the) data transmitter 13 is of the controlled current source type. An arbitration transmitter 15 the output stage of which is also of the controlled current source type, is connected in parallel with the data transmitter 13. The signals produced by the data transmitter and the arbitration transmitter—each in the frequency band assigned to them—are added together and applied to the communication medium. These signals are transmitted to other data stations where detection is effected.

For the detection of the data signals the inner conductor 11 of the coaxial cable is connected to an input of a high-pass filter 17. The data signal, from which the low-frequency arbitration signals have then been removed, is then available at an output 18 of the high-pass filter 17.

The signal with which the data station 10 participates in the arbitration is applied to an input terminal 19. This input terminal 19 is connected to an inverting input of a differential amplifier 20. The non-inverting input of the differential amplifier 20 is connected to the inner conductor 11 of the coaxial cable for the reception of the signals which are transmitted via the communication medium.

Figures 3A, 3B:
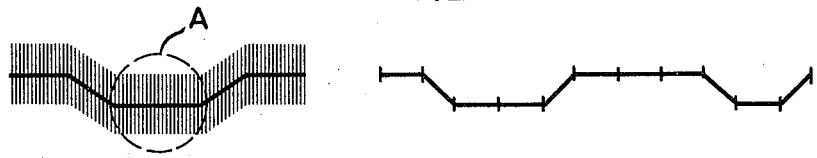

FIG. 3 shows schematically the shape of the signals which are transmitted. FIG. 3a shows the high-frequency packets of data signals (the "hair") superposed on the low-frequency arbitration signals, and FIG. 3b shows an example of an arbitration signal. The transitions in this signal have a limited slope to prevent the arbitration signals from causing errors in the detection of the data signal. The output of the differential amplifier 20 is connected to an integrator 24, via a slew-rate limiting element 21 when provided. The data signal superposed on the low-frequency arbitration signal results in brief but very large deviations in the signal at the output of the differential amplifier 20. The integrator 24 has for its object to limit the response thereto. An output of the integrator 24 is connected to a control input 16 of the arbitration transmitter 15.

The arbitration proceeds as follows. All the competing participants (data stations) simultaneously apply each (bit) value of their arbitration code word to the coaxial cable via input terminal 19, differential amplifier 20, slew-rate limiting element 21 when provided, integrator 24 and arbitration transmitter 15. Participants which present a logic zero as their arbitration bit value while the coaxial cable assumes the logic one state withdraw from the arbitration. Arbitration is first effected with the most significant bit of the arbitration code word. Thereafter, arbitration is effected by the remaining participants with the next but one most significant bit, and so on, until ultimately only one participant with the highest arbitration code word remains. The first bit can be preceded by a start bit (or pulse) to signal to all potential uses that an arbitration is about to start. This is sufficient as the duration of the arbiting bits is much longer than the propagation time of the signal along the bus. This remaining participant is given the opportunity to apply its data packet to the communication medium in the next data signal period via input terminal 14 and data transmitter 13.

Figure 4:
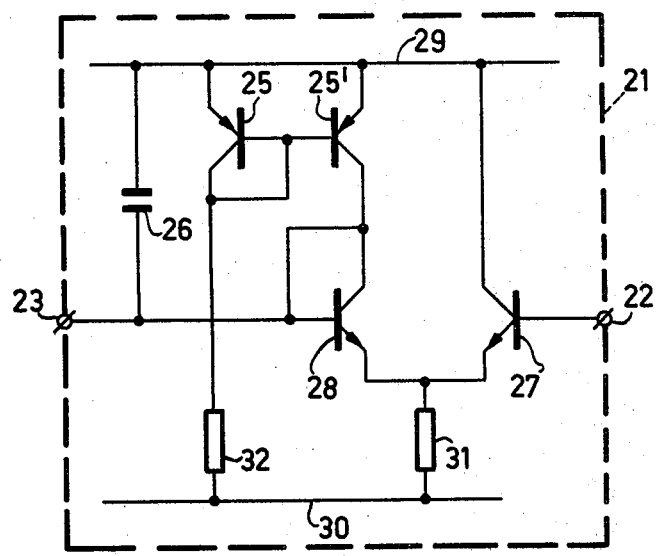
FIG. 4 shows a circuit diagram of a slew-rate limiting element for use in the data station shown in FIG. 2.

In order to further limit the influence exercized on the arbitration signal by the data signal, it is advantageous to arrange the slew-rate limiting element 21 between the differential amplifier 20 and the integrator 24. FIG. 4 shows an attractive embodiment of such a slew-rate limiting element. The slew-rate limiting element comprises a current mirror, predominantly consisting of the PNP transistors 25 and 25' which, operated by a current switch predominantly consisting of the NPN transistors 27 and 28, produce a charging current for a capacitor 26.

The emitters of PNP transistors 25 and 25' are connected to a first supply line 29 of a substantially constant potential, for example 5 V. The base of transistor 25' is connected to the base of transistor 25 and the base of transistor 25 is further connected to the collector of transistor 25. The collector of transistor 25' is connected to the output terminal 23 and to the collector and the base of transistor 28. The collector of transistor 25 is connected through a resistor 32 to a second supply line 30 of substantially constant potential, for example 0V. The transistors 25' and 25 are connected such that they behave as a current mirror, that is to say the collector currents of the transistors 25' and 25 are equal to each other. The capacitor 26 is connected between the first supply line 29 and the output terminal 23.

The emitters of the NPN transistors 27 and 28 are interconnected and connected through a resistor 31 to the second supply line 30. The base of transistor 27 is connected to the input terminal 22 and the collector is connected to the first supply line 29. The collector and the base of transistor 28 are interconnected and connected to the output terminal 23.

Figure 5:
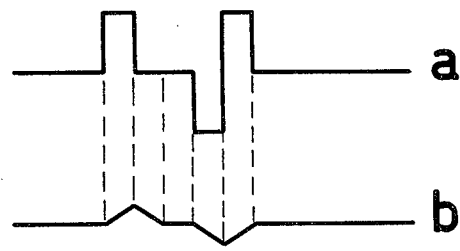
FIG. 5 shows some signal shapes occurring at the input and the output of the slew-rate limiting element shown in FIG. 4.

The slew-rate limiting element shown in FIG. 4 operates as follows. Transistor 25 is biassed such that it carries a predetermined collector current ½ I. Transistor 25' carries substantially the same collector current (½ I). If transistor 28 is rendered non-conducting the collector current ½ I carried by transistor 25' will flow to capacitor 26 via the collector-base short-circuit of transistor 28, whereby said capacitor is charged. If transistor 28 is in the conducting state the collector current ½ I of transistor 25' will flow through transistor 28 while furthermore the discharging current coming from capacitor 26 and determined by the choice of the resistance value of resistor 31 will flow through transistor 28. This discharging current may, for example, be selected equal to the charging current. In that case transistor 28 will therefore carry a current I in the conducting state. Transistor 28 is switched in the rhythm of the signal applied to the base of transistor 27. FIG. 5a shows an example of such a signal. Said signal shows in detail the composition of the signal shown in FIG. 3a (detail A). FIG. 5b shows the output signal which can be taken from output terminal 23. In actual practice the ratio between the amplitudes of the signals shown in FIGS. 3a and 3b is usually greater than shown here.

The effect of the slew-rate limiting element can further be illustrated with reference to a numerical example. Let it be assumed that the arbitration rate is 0.2 Mbit/s and the data rate 20 Mbit/s and that the amplitude of both the arbitration and the data pulses is 0.5 V, then integrator 24 (FIG. 2) must be capable of producing on the communication medium (via current source 15) a slew-rate of:

$$\frac{0.5}{5 \cdot 10^{-6}} = 0.1 \ V/us$$

If the slew-rate limiting element 21 is omitted then the signal produced by differential amplifier 20 will have an extreme value during the data pulses of amplitude 500 mV and pulse width 50 ns. The integrator will then have the above-computed maximum slew-rate. During the data pulses, N arbitration transmitters transmitting simultaneously will cause a disturbance on the cable with a slew-rate of N×0.1 V/us, or N×5 mV/50 ns. So at a maximum permissible disturbance of, for example, 50 mV, only 10 participants can be connected.

If, however, the slew-rate limiting element 21 is inserted in the indicated position, this element being dimensioned such (by the choice of values of capacitor 26 and resistors 31, 32 in FIG. 4) that a slew-rate of 0.1 V/us is also attained, then the amplitude of the data pulses at the output of element 21 will be reduced from 50 mV to 5 mV. This increases the maximum number of participants to be connected at the maximum permissible disturbance of 50 mV by two orders of magnitude.

Figure 6:
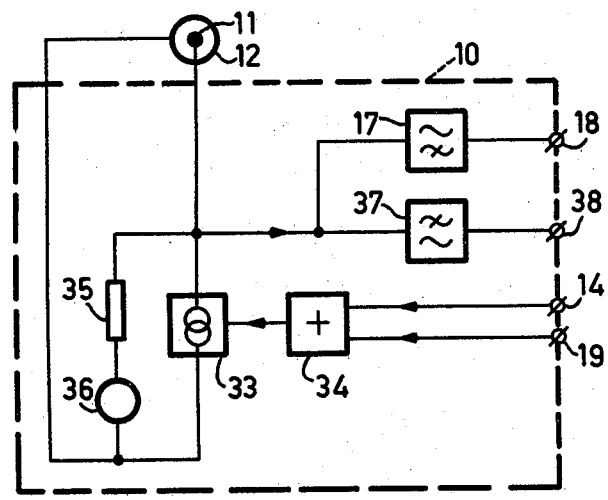
FIG. 6 shows a second embodiment of a data station comprising a data transmitter and receiver and an arbitration transmitter and receiver in accordance with the invention.

FIG. 6 shows a second embodiment of a data station for use in the communication system. A combined arbitration/data transmitter 33 is connected between the inner conductor 11 and outer conductor 12 of a coaxial cable. The transmitter is predominantly formed by a control current source which is controlled by the sum of the arbitration signal applied to terminal 19 and the data signal applied to terminal 14. In an adder element 34 these signals are added together and thereafter applied to a control input of arbitration/data transmitter 33.

In the description of FIG. 2, it has already been mentioned that several participants can be active simultaneously in the arbitration band. In order to prevent the d.c. voltage on the communication medium, i.e. the coaxial cable, from increasing too much the voltage present on the cable is negatively fed back in the arbitration band in each arbitration transmitter. This negative feedback may be carried out in an active mode as described with reference to FIG. 2. In this active mode of negative feedback the voltage present on the cable is compared (by differential amplifier 20, FIG. 2) with the bit to be applied to it, and in dependence thereon the current injected into the cable is corrected. In what is commonly referred to as passive mode of negative feedback which is illustrated in FIG. 6, the cable is loaded by an impedance 35 in series with a voltage source 36. The current in the coaxial cable is limited as a current starts flowing through impedance 35, which is for example a coil, if the voltage on the line exceeds the voltage produced by the voltage source 36. It will be obvious that a zener diode may alternatively be used instead of the voltage source 36.

Figure 7:
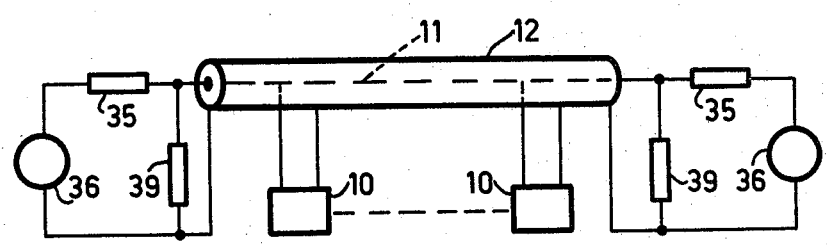
FIG. 7 shows an embodiment of a manner of negative feedback for the arbitration provision.

Instead of the negative feedback being carried out in each separate data station in the manner described above, it is alternatively possible to carry out the negative feedback at the end of the communication medium for the combined data stations, as is shown in FIG. 7. The data stations 10 which are connected between the inner conductor 11 and the outer conductor 12 are of the type shown in FIG. 6, but from which the negative feedback network formed by impedance 35 and voltage source 36 has been omitted. The communication medium is terminated at both ends with a terminating impedance 39 (for example 50 Ohm). A negative feedback network has been provided in parallel with the terminating impedance 39, this negative feedback network also being comprised of an impedance 35 (an inductive element such as a coil in particular) and a voltage source 36 (or a zener diode).

In general, the active method of negative feedback is to be preferred as it does not cause additional load on the data stations and, furthermore, attenuates the signal on the cable to a lesser degree. If an optical fiber is employed as the communication medium, only the active method of negative feedback can be used.

The signals received may be divided by filtering into a data signal and an arbitration signal. To this end, the data station comprises a high-pass filter 17 and a low-pass filter 37. The data signal may be taken from output 18 of high-pass filter 17 and the arbitration signal may be taken from an output 38 of low-pass filter 37.

What is claimed is:

1. A data communication system comprising a plurality of data stations which are interconnected by a common communication medium, each data station comprising a data transmitter for transmitting a data signal via the communication medium and further comprising a data receiver for receiving a signal transmitted by one of the other data stations via the communication medium, and each data station comprising arbitration means to prevent more than one data transmitter transmitting simultaneously via the communication medium, characterized in that the arbitration means in each data station comprise an arbitration transmitter for transmitting an arbitration signal via the communication medium, that the arbitration means further comprise an arbitration receiver for receiving an arbitration signal transmitted by one or more of the arbitration transmitters of other data stations via the communication medium, and that the arbitration transmitters and receivers utilize an arbitration frequency band which is separated from the frequency band of the data transmitters and receivers.

2. A data communication system as claimed in claim 1, characterized in that the data transmitters and receivers utilize a high-frequency band and the arbitration transmitters and receivers utilize a low-frequency band.

3. A data communication system as claimed in claim 1 or claim 2, characterized in that the data stations each have an output stage of the controlled current source type.

4. A data communication system as claimed in claim 1 or claim 2, characterized in that the data transmitters and the arbitration transmitters each have an output stage of the controlled current source type.

5. A data communication system as claimed in claim 1 or claim 2, characterized in that the arbitration transmitter of each data station comprises a controlled arbitration current source, an integrator and a differential amplifier, that the differential amplifier has a first input for receiving the signal present on the communication medium, a second input for receiving a signal with which the data station participates in arbitration, and an output which controls the arbitration current source via the integrator, said current source being coupled to the communication medium.

6. A data communication system as claimed in claim 5, characterized in that the arbitration transmitter further comprises a slew-rate limiting element which is arranged between the output of the differential amplifier and the integrator.

7. A data communication system as claimed in claim 6, characterized in that the slew-rate limiting element comprises a current mirror, a current switch and a capacitor, that the capacitor in one position of the current switch is charged by a substantially constant current produced by the current mirror and in the second position a substantially constant current is withdrawn from the capacitor, and that the current mirror responds to the signals occurring at the output of the differential amplifier.

8. A data communication system as claimed in claim 1 or claim 2, characterized in that each data station comprises a negative feedback network connected to the communication medium.

9. A data communication system as claimed in claim 1 or claim 2, wherein the communication medium is terminated with a terminating impedance, characterized in that the terminating impedance comprises a negative feedback network.

10. A data communication system as claimed in claim 8, characterized in that the negative feedback network comprises a series arrangement of an impedance and a voltage source.

11. A data communication system as claimed in claim 10, characterized in that said impedance is a coil.

12. A data communication system as claimed in claim 1, characterized in that the communication medium is a coaxial cable.

13. A data communication system as claimed in claim 9, characterized in that the negative feedback network comprises a series arrangement of an impedance and a voltage source.

* * * * *